US010060386B2

(12) United States Patent
Eismark

(10) Patent No.: US 10,060,386 B2
(45) Date of Patent: Aug. 28, 2018

(54) PISTON FOR A CYLINDER OF A COMBUSTION ENGINE

(71) Applicant: VOLVO TRUCK CORPORATION, Göteborg (SE)

(72) Inventor: Jan Eismark, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 82 days.

(21) Appl. No.: 14/650,559

(22) PCT Filed: Dec. 18, 2012

(86) PCT No.: PCT/EP2012/005235
§ 371 (c)(1),
(2) Date: Jun. 8, 2015

(87) PCT Pub. No.: WO2014/094796
PCT Pub. Date: Jun. 26, 2014

(65) Prior Publication Data
US 2015/0308371 A1    Oct. 29, 2015

(51) Int. Cl.
*F02F 3/00* (2006.01)
*F02B 23/06* (2006.01)

(52) U.S. Cl.
CPC ........ *F02F 3/0015* (2013.01); *F02B 23/0627* (2013.01); *F02B 23/0651* (2013.01); *Y02T 10/125* (2013.01)

(58) Field of Classification Search
CPC . F02F 3/0015; F02B 23/0627; F02B 23/0651; Y02T 10/125
See application file for complete search history.

(56) References Cited

U.S. PATENT DOCUMENTS 6,935,301 B2 * 8/2005 Liu ..................... F02B 23/0672
123/193.6
7,942,126 B2 * 5/2011 Zoller ................. F02B 23/0651
123/298
(Continued)

FOREIGN PATENT DOCUMENTS

DE    102010027637    *   1/2012   .......... F02B 23/0651
DE    102010027637 A1    1/2012
(Continued)

OTHER PUBLICATIONS

International Search Report (dated Sep. 20, 2013) for corresponding International Application PCT/EP2012/005235.
(Continued)

*Primary Examiner* — Joseph Dallo
*Assistant Examiner* — Kurt Liethen
(74) *Attorney, Agent, or Firm* — WRB-IP LLP

(57) ABSTRACT

A piston for a cylinder of a combustion engine includes piston crown including a piston bowl formed by an upwardly facing cavity, the piston bowl including a floor section with a central, and a side section, the side section connecting the inner section with an upper surface of the piston crown, wherein the side section is formed with mutually spaced apart ridges protruding towards the apex, and wherein the side section having at least one recess at an upper end of the side section connecting the side section with the upper surface of the piston crown.

13 Claims, 4 Drawing Sheets

(56) References Cited

U.S. PATENT DOCUMENTS

| | | | | |
|---|---|---|---|---|
| 8,156,927 | B2* | 4/2012 | Iikubo | F02B 23/0672 |
| | | | | 123/661 |
| 8,459,229 | B2* | 6/2013 | Rothbauer | F02B 23/0651 |
| | | | | 123/276 |
| 8,646,428 | B2* | 2/2014 | Eismark | F02B 23/0627 |
| | | | | 123/193.6 |
| 9,279,361 | B2* | 3/2016 | Rothbauer | F02F 3/26 |
| 9,476,381 | B2* | 10/2016 | Bowing | F02B 23/0621 |
| 2010/0258076 | A1* | 10/2010 | Eismark | F02B 23/0651 |
| | | | | 123/279 |
| 2011/0253094 | A1 | 10/2011 | Rothbauer et al. | |
| 2011/0253095 | A1 | 10/2011 | Rothbauer et al. | |

FOREIGN PATENT DOCUMENTS

| | | | |
|---|---|---|---|
| EP | 0528166 A1 | 2/1993 | |
| JP | S52006809 | 1/1977 | |
| JP | 201185242 | 9/2011 | |
| WO | 2009058055 A1 | 5/2009 | |
| WO | WO 2013152870 A1 * | 10/2013 | F02B 23/0621 |

OTHER PUBLICATIONS

International Preliminary Report on Patentability (dated Jan. 5, 2015) for corresponding International Application PCT/EP2012/005235.

Japanese Official Action (translation) (dated Aug. 29, 2016) for corresponding Japanese App. 2015-546861.

* cited by examiner

PISTON FOR A CYLINDER OF A COMBUSTION ENGINE

BACKGROUND AND SUMMARY

The present invention relates to a piston. In more detail, the present invention relates to a piston for use in a cylinder of an internal combustion engine, wherein the shape of the piston reduces the soot emissions of the internal combustion engine.

Soot particles, or particulates, are a product which, during combustion, can be formed and subsequently oxidized into carbon dioxide, CO2.

Combustion with fuel, i.e. rich, fuel/air mixture with poor mixing at high temperature produces high soot formation. If the formed soot particles can be brought together with oxidizing substances such as e.g. oxygen atoms, oxygen molecules, hydroxide at sufficiently high temperature for a good oxidation rate, a greater part of the soot particles can be oxidized. In a diesel engine, the oxidation process is considered to be in the same order of magnitude as the formation, which means that net soot production is the difference between formed quantity of soot and oxidized quantity of soot. The net emission of soot can therefore be influenced firstly by reducing the formation of soot and secondly by increasing the oxidation of soot. Carbon monoxide emissions and hydrocarbon emissions are normally very low from a diesel engine. However, the percentages can rise if unburnt fuel ends up in relatively cool regions. Such regions are, for example, zones with intense cooling located close to the cylinder wall.

A combustion process in which the fuel is injected directly into the cylinder and is ignited by increased temperature and pressure in the cylinder is generally referred to as the diesel process. When the fuel is ignited in the cylinder, combustion gases present in the cylinder undergo turbulent mixing with the burning fuel, so that a mixture-controlled diffusion flame is formed. The combustion of the fuel/gas mixture in the cylinder gives rise to heat generation, which causes the gas in the cylinder to expand and which hence causes the piston to move in the cylinder. Depending on a number of parameters, such as the injection pressure of the fuel, the quantity of exhaust gases re-circulated to the cylinder, the time of injection of the fuel and the turbulence prevailing in the cylinder, different efficiency and engine emission values are obtained.

An approach to solve the problem of reducing soot emissions is disclosed in WO 2009/058 055, which describes an internal combustion engine. The internal combustion engine in WO 2009/058 055 comprises a piston having protrusions mutually spaced apart from each other in a circumferential direction of the piston. These protrusions are configured to receive a flame of burned fuel. When the flame impinges a wall between a pair of protrusions, the flame will be directed towards the protrusions which will direct the flame back towards the centre of the cylinder. Hereby, the amount of soot can be reduced by means of the flame recirculation.

Although the piston described in WO 2009/058 055 reduces soot emissions, it is still in need of further improvements such as e.g. providing an increased degree of combustion efficiency for the internal combustion engine in which it is positioned.

It is desirable to provide a piston having such shape and functions that, when in use, further reduces the soot emissions from the internal combustion engine.

According to a first aspect of the present invention there is provided a piston for a cylinder of a combustion engine, the piston comprising: a piston crown comprising a piston bowl formed by an upwardly facing cavity; the piston bowl including a floor section with a central apex, an inner section extending downwardly from the apex, and a side section, the side section connecting the inner section with an upper surface of the piston crown, wherein the side section is formed with mutually spaced apart ridges protruding towards the apex, and wherein the side section having at least one recess at an upper end of the side section connecting the side section with the upper surface of the piston crown.

The present invention is based on the insight that during ignition in a cylinder of an internal combustion engine a flame that impinges the side section below the at least one recess will not only be directed towards the ridges, but will also be directed in an upward direction towards the cylinder liner. By providing a recess in the piston crown, a majority of the part of the flame directed towards the cylinder liner will instead become directed towards the cylinder head and thereafter back towards the centre of the cylinder. An advantage of the invention is, at least, that a reduction of soot emissions is provided for the internal combustion engine in which the piston is positioned, since the combination of a ridge and a recess increases the amount of the flame directed back towards the centre of the cylinder. Also, by providing a recess in accordance with the present invention enables for a reduction of a spray axis angle, i.e. the angle of which the spray is injected into the cylinder, which will be further described below. A reduction of the spray axis angle provides for an improved combustion process of the combustion chamber in the cylinder, since a larger amount of the flame will be directed towards the ridges and thereby be directed towards the centre of the cylinder which reduces the loss of kinetic energy of the flame. The recess will also direct the upwardly portion of the flame towards the centre of the cylinder.

The present invention is directed towards pistons which are configured to be arranged in internal combustion engines with no, or low, swirling effect during operation. The ratio of swirl in an internal combustion engine is a ratio of the tangential velocity of the air spinning around the combustion chamber divided by the engine speed. Accordingly, the swirl ratio is a measure of the tangential motion of air as it enters the engine cylinder from induction ports of the cylinder head. The swirl ratio of the present invention is below 0.7 which is considered to be low swirl.

The wording "upper surface" should be interpreted as the surface of the piston which is, when the piston is positioned in a cylinder of a combustion chamber, faces the cylinder head and hence being the part of the piston located closest to the cylinder head. Similarly, the wording "upwardly facing" should thus be interpreted as facing the cylinder head when the piston is mounted in the cylinder. The wording "upper" and "upwardly" hence correspond to the direction away from an engine crank shaft when the piston is positioned in a cylinder.

According to an example embodiment of the present invention, ridges and recesses may be formed alternatingly in the circumferential direction of the side section.

According to an example embodiment of the present invention, the at least one recess may be positioned at an equal distance from its closest ridges.

Hereby, the ridges are arranged symmetrically in relation to the at least one recess. The flame will thus impinge the side section and be directed not only to the recess, but towards each of the adjacent ridges. The flame will, due to the equal distance between the at least one recess and the respective ridges, reach each of the adjacent ridges at an approximately equal point in time.

According to an example embodiment of the present invention, the side section may have a concave curvilinear shape in cross section. According to an example embodiment of the present invention, the at least one recess may be symmetrically formed in relation to a respective plane extending in an axial and radial direction of the piston crown, the geometric plane crossing the recess at a centre thereof in a circumferential direction.

In a cylinder having no, or low, swirling effect, the flame will impinge the side section substantially perpendicular to the side section. An advantage of having a recess which is symmetrical is thus that the flame may be controlled such that it will be directed towards a centre of the cylinder after being received in the recess.

According to an example embodiment of the present invention, each of the ridges may be symmetrically formed in relation to a respective plane extending in an axial and radial direction of the piston crown, the geometric plane crossing the ridge at a centre thereof in a circumferential direction.

An advantage is that the portion of the flame that is directed towards the ridge will also, as for the portion of the flame directed into the recess, be directed towards a centre of the cylinder when the flame arrives at the ridge.

By controlling the flame such that a majority of the flame, after impinging the side section, is provided into a centre of the cylinder, the combustion process is improved, i.e. the efficiency of the internal combustion engine is increased. Also, and as described above, soot emissions are reduced and the risk of contaminating e.g. the piston rings will be reduced since the flame is provided towards the centre of the cylinder away from the piston rings. Further, controlling the flame in accordance with the above, the combustion process may be executed more optimal, which is beneficial in relation to combustion executed "too late" in a cycle, as this reduces the thermodynamic efficiency.

According to an example embodiment of the present invention, at least one of the ridges may extend into at least a portion of the inner section.

Hereby, the ridges may be designed to be large enough to guide the flame towards the centre of the cylinder.

According to an example embodiment of the present invention, at least one of the ridges may extend from the upper surface towards the inner section.

Accordingly, there is flexibility when designing the ridges, which may be designed differently depending on e.g. the size and configuration of the piston and/or cylinder in which the piston is configured to be provided into.

According to an example embodiment of the present invention, each of the recesses may have a horizontal seat section and a vertical wall section, wherein the horizontal seat section is connected to the vertical wall section by means of a radius. According to an example embodiment, the vertical wall section may be approximately 15-30% of the depth of the piston and the horizontal seat section may have a length in the range from the length of the vertical wall section up to twice the length of the vertical wall section.

According to a second aspect of the present invention there is provided an internal combustion engine comprising a cylinder and a piston according to any one of the above described embodiments.

Effects and features of this second aspect are largely analogous to those described above in relation to the first aspect of the present invention.

According to an embodiment of the present invention, the internal combustion engine is a low-swirl internal combustion engine.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of an exemplary embodiment of the present invention, wherein.

DETAILED DESCRIPTION

Figure 1:
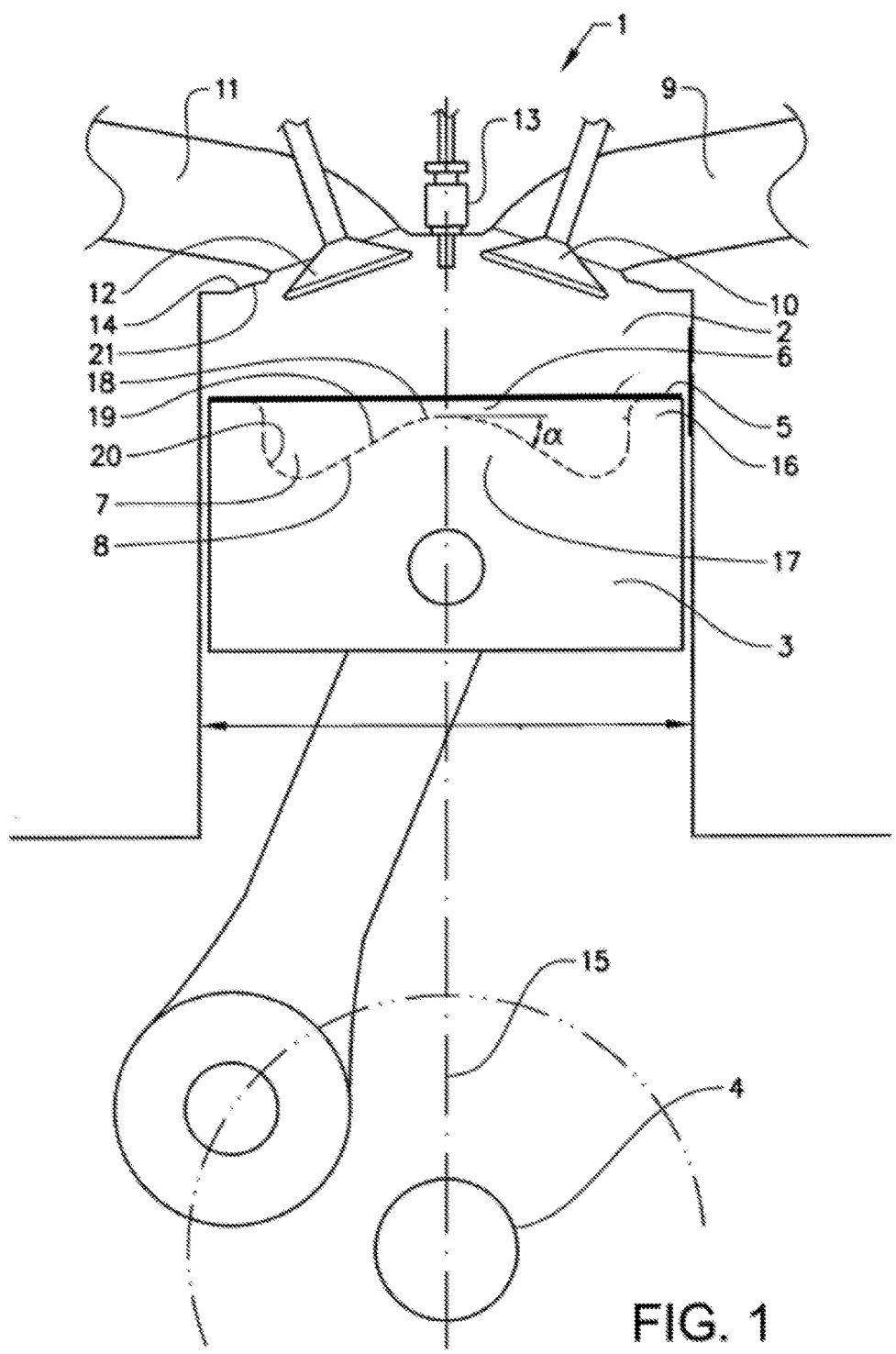
FIG. 1 illustrates a side view of an example embodiment of the piston when being arranged in a cylinder of an engine.

The present invention will now be described more fully hereinafter with reference to the accompanying drawings, in which an exemplary embodiment of the invention is shown. The invention may, however, be embodied in many different forms and should not be construed as limited to the embodiment set forth herein; rather, this embodiment is provided for thoroughness and completeness. Like reference character refer to like elements throughout the description.

Figure 2:
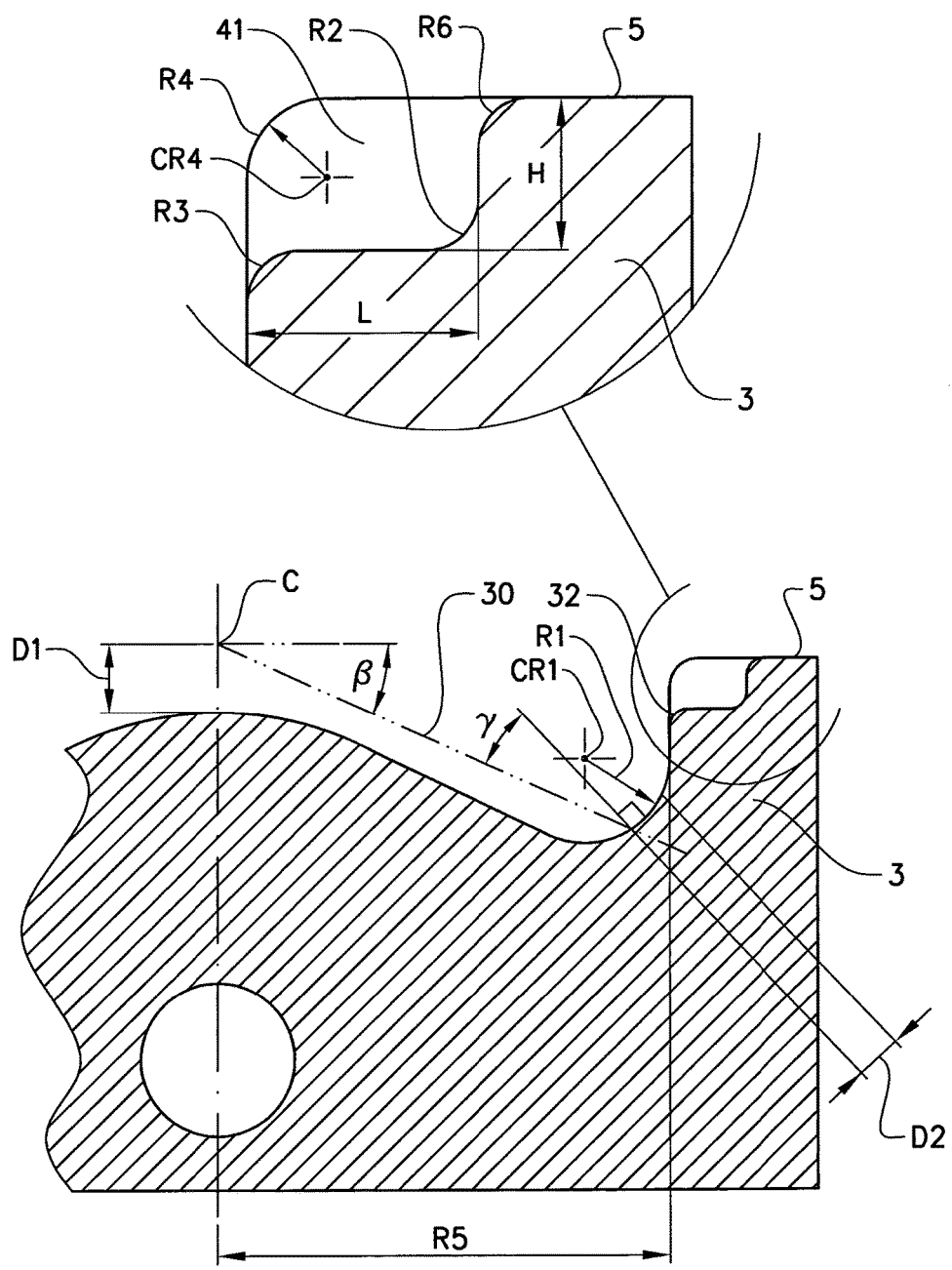
FIG. 2 illustrates in detail a portion of the piston in FIG. 1.

Firstly, attention is drawn to FIG. 1 which illustrates the inventive piston 3 arranged in a cylinder 2 of an internal combustion engine 1. To understand the unique physical characteristics of the combustion provided by means of the inventive piston 3, FIGS. 1 and 2 illustrates the various physical characteristics or parameters provided in a cylinder arrangement and in the inventive piston 3. Hence, FIG. 1 will incorporate a description of the combustion process including parameters of both the inventive piston 3 as well as parameters of the cylinder 2 and engine 1 into which the piston 3 is configured to be arranged.

In FIG. 1, a side view is shown of a combustion engine 1 which is designed to work according to the diesel process. The engine 1 comprises a cylinder 2 and a piston 3, which reciprocates in the cylinder 2 and is connected to a crankshaft 4 so that the piston 3 is set to reverse in the cylinder 2 at an upper and lower dead centre position. As is also common, one end of the cylinder cavity is closed by an engine cylinder head 14. The piston 3 is provided with a piston bowl 6 in its upper surface 5, which piston bowl 6 forms a combustion chamber 7, together with inner surface 21 of a cylinder head 14 and walls of the cylinder 2. In the cylinder head 14 one or more induction ports 9 are arranged. The connection between a respective induction port 9 and the cylinder 2 can be opened and closed with an induction valve 10 disposed in each induction port 9. Arranged in the cylinder head are also one or more exhaust ports 11. The connection between a respective exhaust port 11 and the cylinder 2 can be opened and closed with an exhaust valve 12 disposed in each exhaust port 11. The opening and closing of valves 10 and 11 may be achieved by a mechanical cam or hydraulic actuation system or other motive system in carefully controlled time sequence with the reciprocal movement of piston 3.

In the cylinder head 14 there is disposed at least one fuel injector 13, through which fuel is injected into the cylinder 2 as a fuel spray so that the fuel is mixed with gas compressed in the cylinder 2 to form a fuel/gas mixture, which is ignited by compression heat generated in the cylinder 2. The ignited part of the spray forms a flame. During injection a part of the spray closest to the injector with newly injected fuel has not yet started to burn. The fuel is preferably injected with a very high pressure. Injector 13 includes a plurality of small injection orifices (not shown), formed in the lower end of a nozzle assembly of the injector 13 for permitting the high pressure fuel to flow from a nozzle cavity of the injector 13 into the combustion chamber 7 with a very high pressure to induce thorough mixing of the fuel with the high temperature, compressed charge air within combustion chamber 7. It should be understood that injector 13 may be any type of injector capable of injecting high pressure fuel through a plurality of injector orifices into the combustion chamber 7. Moreover, injector 13 may include a mechanically actuated plunger (not shown) housed within the injector body for creating the high pressure during an advancement stroke of the plunger assembly. Alternatively, the injector 13 may receive high pressure fuel from an upstream high pressure source such as in a pump-line-nozzle system including one or more high pressure pumps and/or a high pressure accumulator and/or a fuel distributor. The injector 13 may include an electronically actuated injection control valve which supplies high pressure fuel to the nozzle valve assembly to open a nozzle valve element, or controls the draining of high pressure fuel from the nozzle valve cavity to create a pressure imbalance on the nozzle valve element thereby causing the nozzle valve element to open and close to form an injection event. For example, the nozzle valve element may be a conventional spring-biased closed nozzle valve element actuated by fuel pressure. The fuel injector 13 is preferably centrally disposed in the cylinder head so a geometrical central axis of the fuel injector coincide with a geometrical central axis 15 of the cylinder, which geometrical central axis also is an axis of reciprocation of the piston 3, as shown in FIG. 1.

The combustion engine 1 shown in FIG. 1 may, according to one example embodiment, work according to the four-stroke principle. The combustion engine may however also work according to a 2-stroke, 6-stroke, 8-stroke cycle as well, or to any other alternative thermodynamic cycles. The engine 1 preferably comprises a plurality of cylinders 2, each provided with a piston 3, where each piston 3 is connected to a common crankshaft 4 through a connecting rod and thus causing the piston to reciprocate along a rectilinear path within the cylinder 2 as the engine crankshaft 4 rotates.

FIG. 1 illustrates the position of the piston 3 approximately 45 degrees before a top dead center position, in the following referred to as TDC position. A TDC position is achieved when the crankshaft has positioned the piston in the position furthest most away from the rotational axis of the crankshaft. In the conventional manner, the piston moves from the top dead center position to a bottom dead center position, in the following referred to as a BDC position, when advancing through intake and power strokes. For purposes of this disclosure, the words "upward" and "upwardly" correspond to the direction away from the engine crankshaft and the words "down" and "downwardly" correspond to the direction toward the crankshaft of the engine or bottom dead center position of the piston.

At an uppermost, TDC position, piston 3 has just completed its upward compression stroke during which the charge air allowed to enter the combustion chamber 7 from induction port 9 is compressed thereby raising its temperature above the ignition temperature of the engine's fuel. This position is here considered as the 360 degrees position commencing the expansion/combustion stroke of the complete 720 degrees four stroke cycle of piston 3. The amount of charge air that is caused to enter the combustion chambers may be increased by providing a pressure boost in the engine's intake manifold. This pressure boost may be provided, for example, by a turbocharger (not shown) driven by a turbine powered by the engine's exhaust, or maybe driven by the engine's crankshaft.

Moreover, the overall dimensions, shape and/or relative positioning of the combustion chamber components and features are such that the momentum of the fuel spray/burning cylinder gas flame is preserved as long as possible on its way from the injector in a slightly downward, direction following the shape of the inner section 19 and side section 20, and further upwards until impingement with inner surface 21 of the cylinder head occurs, thus ensuring sufficient oxidation of soot later in the combustion event.

Figure 3:
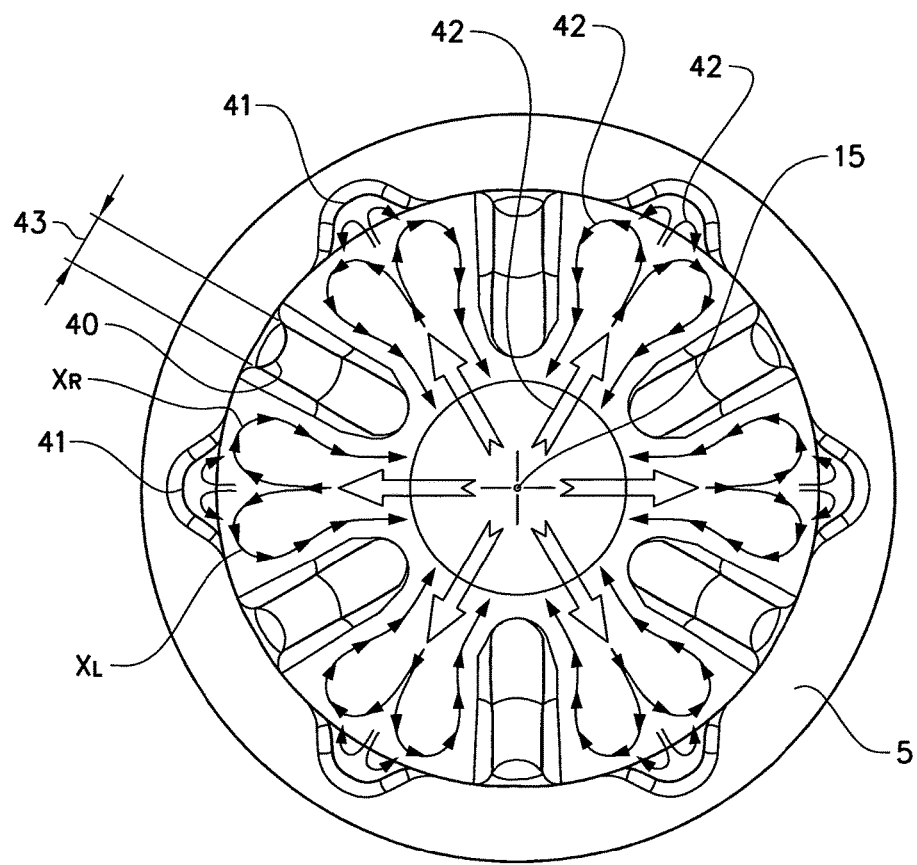
FIG. 3 illustrates a top view of the embodiment in FIGS. 1 and 2 in which the flame during combustion is illustrated.
Figure 4:
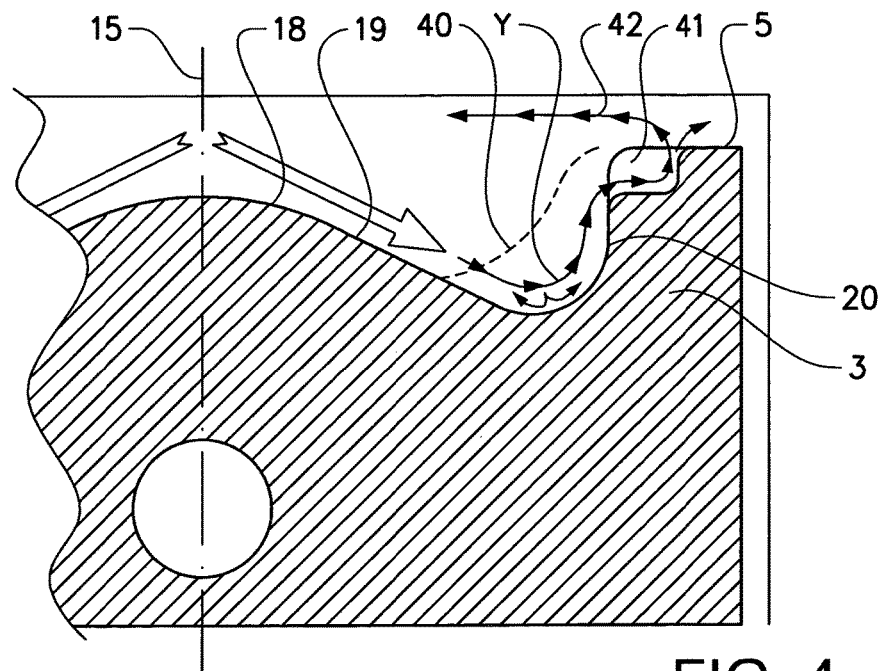
FIG. 4 illustrates a portion of a side view of the embodiment in FIGS. 1-3 during combustion of the engine.

Also, the vertical and tangential movements of the flame form a fan-shaped pattern just after impingement with side section 20, where approximately ¼-⅕ of the flame movements are directed upwardly, as indicated with Y in FIG. 4, and the remaining portion of the flames movements are directed in a tangential (horizontal) direction, as indicated with XR for the parts of the flame turning right and with XL for the parts of the flame turning left when hitting the side section 20, as shown in FIG. 3. This invention is particularly directed towards the enhancement of the redirection of the vertical movements of the flame in conjunction with the redirection of the horizontal movements of the flame, i.e. when the flame changes direction from being directed towards the side section to being directed in said vertical direction and said tangential direction, and further the redirection of the vertical movements and tangential movements to movements directed toward the axis 15, which is seen in FIGS. 3 and 4, respectively.

The dimensions, shape and configuration of the inventive piston 3 positioned in a cylinder 2 as described herein results in an arrangement when positioned in a combustion chamber which is capable of forming, directing, controlling and creating a pattern of injected fuel. Most of all, the arrangement being capable of burning fuel/cylinder gas mix (flame) within the combustion chamber 7 during both the initial stages of fuel injection and during the initiation of combustion and expansion of the resulting gases during the power stroke of the piston 3 and after end of injection, so as to achieve very high reduction of especially soot emissions, but also to improve efficiency by means of a faster combustion rate.

More particularly, the upper portion of the piston 3 may be referred to as the piston crown 16. The piston crown 16 includes the upper surface 5 partially defining the combustion chamber 7 and a piston bowl 6 formed by an upwardly open cavity. The piston bowl 6 includes a floor section 8 having a projecting portion 17 preferably positioned at or near the center of bowl 6. The projecting portion 17 includes an apex 18 which is positioned, in the preferred embodiment shown in FIG. 1, at the center of the piston bowl 3 and thus positioned along the axis of reciprocation 15 of the piston 3. The projecting portion 17 also includes an inner section 19 extending from the apex 18 downwardly at an inner bowl floor angle a from a plane perpendicular to the axis of reciprocation of piston 3 as shown in FIG. 1.

The floor section 8 of the piston bowl 6 also includes a side section 20 having a generally concave curvilinear shape in diametric cross section. The side section 20 effectively shapes and directs the flow of the fuel/air mixture or flame within the combustion chamber, especially in the upward direction.

Turning now to FIG. 2, which shows the right half of the bowl shape of the piston in FIG. 1 with reflection angle $\gamma$ of the geometrical central axis 30 of the spray (below designated spray axis) and spray axis angle $\beta$ (below designated spray angle). The spray axis is arranged by means of the fuel injector 13 which directs the flame towards the side section 20 below the recesses. Accordingly, the flame hits the side section 20 below the recess 41. The reflection angle $\gamma$ defines the angle of the flame after impingement with the side section 20. Side section 20 is designed with a particular radius R1. D1 further indicates the distance between the apex 18 and the crossing point C of the several spray axis in the injector 13. Distance D2 indicates the location on which the spray hits the side section 20 during downward movement of the piston 3, i.e. the distance on which the injection of the spray axis impinge the side section during the downward movement of the piston 3. The position of start and end of D2 is dependent on time duration (amount of fuel to be injected) and timing of the injection. Start of injection is in the lower end of the distance D2 and end of injection is in the upper end of the distance D2. R4 indicates a radius at the lip or edge connecting the side section 20 with the upper surface 5 of the piston 3 where no recess 41 is arranged.

Center of radius R4 is indicated CR4. The recess is detailed in the zoom in portion of FIG. 2 wherein the recess is defined as having a horizontal seat section L and a vertical wall section H. The horizontal seat section L and a vertical wall section H are connected to each other by a radius R2. The horizontal seat section L and the side section 20 are connected to each other by means of a radius R3 and the vertical wall section H and the upper surface is connected to each other by means of a radius R6. The vertical wall section is, in the exemplified embodiment depicted in FIG. 2, approximately 15-30% of the depth of the piston and the horizontal seat section L has a length in the range of H to H*2. R5 indicates piston bowl radius.

While the general shape of the combustion chamber has antecedence in the prior art, it is the specific configuration, and more importantly, the critical dimensions and dimensional relationships described hereinbelow which result in the improved functional performance of the present invention.

The value of the reflection angle during an injection is strongly dependent of the selection of several geometrical parameters, such as D1, R1, $\beta$ and piston bowl radius R5, besides the injection timing and injection duration.

Reference is now made to FIG. 3, illustrating a top view of the piston 3 depicted in FIGS. 1 and 2, in conjunction with an illustration of the propagation of the above described flame 42 from the injector 13. A side view illustrating the propagation of the flame from the injector 13 is depicted in FIG. 4 and described further below. FIGS. 3 and 4 hence illustrate the flame 42 seen from different views and thereby described separately hereinafter.

As can be seen in FIG. 3 the piston bowl comprises ridges 40 and recesses 41. The ridges 40 are formed in the side section 20 and are evenly distributed in the circumferential direction of the side section 20. Furthermore, the ridges may extend from the upper surface to the inner section 9. The ridges may on the other hand be smaller in size and hence not extend all the way to the inner section 19 and thus end in the side section 20. The size and extension of the ridges may depend on e.g. the specific use of the piston 3 or its size. Moreover, the recesses 41 are formed in the side section 20 and the upper surface 5 of the piston crown 16. Accordingly, the recesses 41 are formed in the interference between the side section 20 and the upper surface 5. The recesses 41 are also evenly distributed in the circumferential direction of the side section 20. As is further depicted in FIG. 3, the ridges 40 and the recesses 41 are formed at a relatively equal distance from each other, thereby providing a relatively symmetrical distribution of ridges 40 and recesses 41.

Furthermore, during combustion in the cylinder of the internal combustion chamber, the flame 42 is directed from the injector 13 which location coincides with the geometrical central axis 15 of the cylinder. The flame 42 is directed radially towards the circumference of the piston where it impinges the side section 20 at a location below the respective recess 41, which is best illustrated in FIG. 4. When the flame 42 impinges the side section 20, a portion thereof is directed in a tangential direction to the left XL and right XR, respectively. The tangentially directed flame then arrives at the ridge 40 where it is directed substantially towards the geometrical central axis 15 of the cylinder. By means of the ridges 40, the flames impinging the side section 20 at each side of a respective ridge 40 will hence not collide with each other as would be the case of a piston 3 without ridges 40. The ridges 40 hence reduce the loss of kinetic energy of the flame during combustion.

Turning to FIG. 4, the propagation of the flame is illustrated from a side view of the piston. As described above in relation to FIG. 3, when the flame impinge the side section 20 a portion thereof is directed in the tangential direction. As illustrated in FIG. 4, a portion of the flame 42 is also directed in a vertical direction Y. It has been surprisingly discovered by the inventors of the present invention that by providing a recess 41 at a location above an impingement area of the flame, the portion of the flame that is directed in a vertical direction Y will be directed into the recess and thereafter directed substantially towards the geometrical central axis 15 of the cylinder. Hereby, a reduction of soot particles being directed towards e.g. the piston rings is hence reduced in comparison to pistons without the described recesses. By providing the recess 41 in the piston as described above and especially depicted in FIG. 4, an increased portion of the flame will be directed substantially towards the geometrical central axis 15 of the cylinder. Hereby, it is possible to reduce the above described spray axis angle $\beta$. With a reduction of the spray axis angle $\beta$, a larger amount of the flame will be directed upwardly after impinging the side section in comparison to increasing the spray axis angle. However, the recess will enable the increased portion of the flame that is directed upwards to be redirected towards the centre of the cylinder after being received in the recess 41. The recess 41 which directs a majority of the flame towards the centre of the cylinder will thus enable for an increased freedom when designing the piston. A reduction of the spray axis angle $\beta$ provides for an improved combustion process of the combustion chamber in the cylinder, since a larger amount of the flame will be directed towards the ridges and thereby be directed towards the centre of the cylinder which reduces the loss of kinetic energy of the flame. However, an increased amount of the flame may be directed upwards when reducing the spray cone angle after impingement with the side section. The recess will hence direct the upwardly portion of the flame towards the centre of the cylinder and thereby also directing this portion of the flame towards the centre of the cylinder.

According to an embodiment of the invention, to be able to ensure control of the spray/flame movement during the whole combustion, the momentum created by the injection pressure should be disturbed as little as possible. Thus, according to the invention, low swirl is preferable to be able to achieve maximum advantage of the present invention when the ridges 40 and recesses 41 are symmetrical as indicated above and in the figures. In this description a swirl below 1.0 is considered to be low swirl. The applicant has found that a swirl ratio below 0.7 is preferable, and even more preferable is a swirl ratio below 0.5 and down to zero for the above described embodiments.

Figure 5:
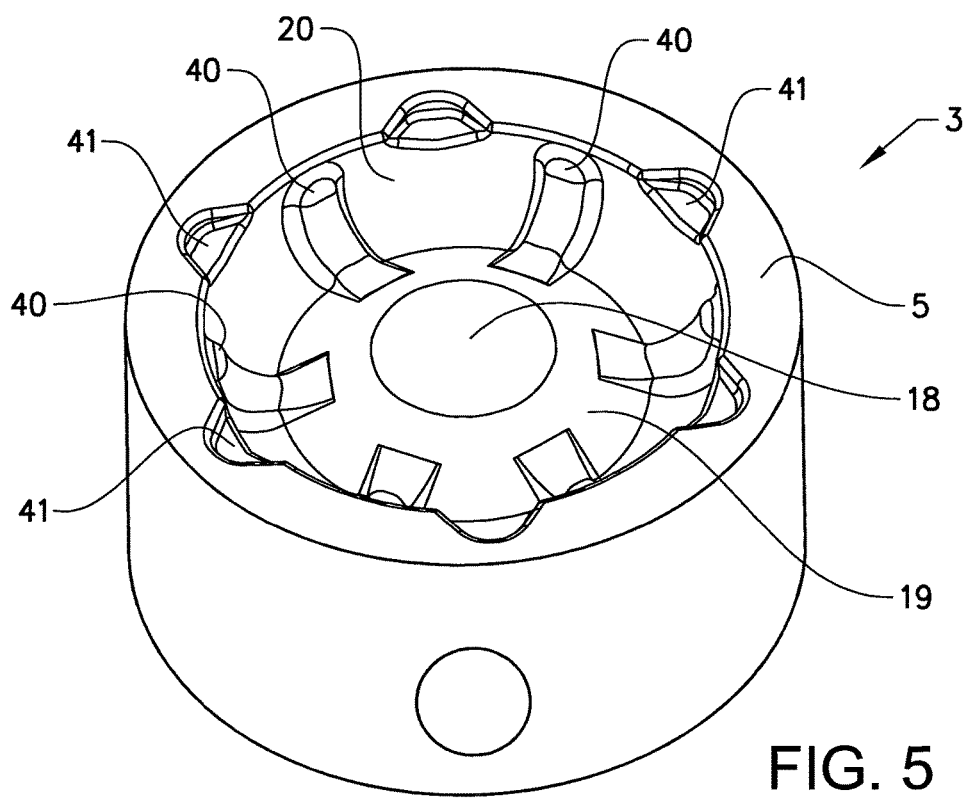
FIG. 5 illustrates a perspective view of an example embodiment of the inventive piston.

Finally, attention is drawn to FIG. 5 illustrating a perspective view of an embodiment of the above described inventive piston 3. The piston 3 illustrated in FIG. 5 comprises six mutually spaced apart ridges 40 arranged in the circumferential direction of the side section 20 as well as six mutually spaced apart recesses 41 arranged in the circumferential direction between the side section 20 and the upper surface 5 of the piston crown 16. Although the piston depicted in FIG. 5 comprises six ridges 40 and six recesses 41, the present invention is of course equally applicable with more or less ridges and recesses. The specific number is merely dependent on the specific use and size of the piston.

Although the invention has been described in relation to a specific piston having specific ridges and recesses, the invention should not be construed as limited to exclude other shapes and forms of the ridges and recesses, respectively. For example, the ridges can be sharper having a less continuous transition between the ridge part and the circular shape of the side section. In another embodiment the end of the base of the ridge can be less sharp with a smoother transition between the ridge part and the circular shape of the side section. A combination of a sharper top of the ridge and smoother transition from ridge to circular shape of the side section is also possible. Each half of a width of the base of a ridge can be extended up to, for example, approximately ⅓ of a total spray sector distance along the circular shape of a side section. Other configurations are hence conceivable as will be appreciated by the skilled person. The size and shape of the recesses may also be arranged in a wide range of configurations, which may be dependent on specific applications of the pistons. For example, if the width of the flame is relatively large, it may be necessary to provide a relatively wide recess so that the portion of the flame directed upwards is received in the recess. Thus, the above description of the example embodiment of the present invention and the accompanying drawings are to be regarded as a non-limiting example of the invention and the scope of protection is defined by the appended claims. Any reference sign in the claims should not be construed as limiting the scope.

The invention claimed is:

1. A piston for a cylinder of a combustion engine, the piston comprising:
 a piston crown comprising a piston bowl formed by an upwardly facing cavity;
 the piston bowl including a floor section with a central apex, an inner section extending downwardly from the central apex, and a side section, the side section connecting the inner section with an upper surface of the piston crown,
 wherein the side section is formed with mutually spaced apart ridges protruding towards the central apex,
 wherein the side section has a plurality of recesses at an upper end of the side section connecting the side section with the upper surface of the piston crown,
 wherein the plurality of recesses is formed in an interference between the side section and the upper surface,
 the side section further comprising impingement areas,
 each of the plurality of recesses being located above the impingement areas and each of the plurality of recesses being configured to direct an upwardly directed portion of a flame that impinges on the impingement areas toward a center of the piston,
 each impingement area of the impingement areas being arranged between two of the ridges, and
 the ridges being configured to direct a tangentially directed portion of the flame that impinges on the impingement areas toward a center of the piston.

2. The piston according to claim 1, wherein ridges and plurality of recesses are formed alternatingly in a circumferential direction of the side section.

3. The piston according to claim 1, wherein each recess of the plurality of recesses is positioned at an equal distance front a closest ridge.

4. The piston according to claim 1, wherein the side section having a concave curvilinear shape in cross section.

5. The piston according to claim 1, wherein each recess of the plurality of recesses is symmetrically formed in relation to a respective plane extending in an axial and radial direction of the piston crown, a geometric plane crossing the recess at a centre thereof in a circumferential direction.

6. The piston according to claim 1, wherein each of the ridges is symmetrically formed in relation to a respective plane extending in an axial and radial direction of the piston crown, a geometric plane crossing the ridge at a centre thereof in a circumferential direction.

7. The piston according to claim 1, wherein at least one of the ridges extend into at least a portion of the inner section.

8. The piston according to claim 1, wherein at least one of the ridges extends from the upper surface towards the inner section.

9. The piston according to claim 1, wherein each of the recesses has a horizontal seat section and a vertical wall section, wherein the horizontal seat section is connected to the vertical wall section by means of a radius.

10. An internal combustion engine comprising a cylinder and a piston, the piston comprising:
 a piston crown comprising a piston bowl formed by an upwardly facing cavity;
 the piston bowl including a floor section with a central apex, an inner section extending downwardly from the central apex, and a side section, the side section connecting the inner section with an upper surface of the piston crown,
 wherein the side section is formed with mutually spaced apart ridges protruding towards the central apex,
 wherein the side section has a plurality of recesses at an upper end of the side section connecting the side section with the upper surface of the piston crown,
 wherein the plurality of recesses is formed in an interference between the side section and the upper surface,
 the side section further comprising impingement areas,
 each of the plurality of recesses being located above the impingement areas and each of the plurality of recesses being configured to direct an upwardly directed portion of a flame that impinges on the impingement areas toward a center of the piston, each impingement area of the impingement areas being arranged between two of the ridges, and the ridges being configured to direct a tangentially directed portion of the flame that impinges on the impingement areas toward a center of the piston.

11. The internal combustion engine according to claim 10, wherein the internal combustion engine is a low-swirl internal combustion engine.

12. The internal combustion engine according to claim 10, wherein each of the plurality of recesses comprises a horizontal seat section and a vertical wall section, the vertical wall section having a length being between 15-30% of a depth of the piston bowl measured between a lowest point in the piston bowl and the upper surface of the piston crown, and the horizontal seat section comprising a length between the length of the vertical wall section and 2.5 times the length of the vertical wall section.

13. The piston according to claim 1, wherein each of the plurality of recesses comprises a horizontal seat section and a vertical wall section, the vertical wall section having a length being between 15-30% of a depth of the piston bowl measured between a lowest point in the piston bowl and the upper surface of the piston crown, and the horizontal seat section comprising a length between the length of the vertical wall section and 2.5 times the length of the vertical wall section.

* * * * *